(12) United States Patent
Stelzer

(10) Patent No.: US 7,575,014 B2
(45) Date of Patent: Aug. 18, 2009

(54) CONTROL OF ENGINE INTAKE DOOR

(75) Inventor: James F. Stelzer, St. Louis, MO (US)

(73) Assignee: Aerospace Filtration Systems, Inc., St. Charles, MO (US)

( * ) Notice: Subject to any disclaimer, the term of this patent is extended or adjusted under 35 U.S.C. 154(b) by 718 days.

(21) Appl. No.: 11/192,900

(22) Filed: Jul. 29, 2005

(65) Prior Publication Data

US 2007/0025838 A1 Feb. 1, 2007

(51) Int. Cl.
*F02B 27/00* (2006.01)
*F02K 99/00* (2009.01)
(52) U.S. Cl. .................. 137/15.1; 60/39.092; 244/53 B
(58) Field of Classification Search ................ 137/15.1, 137/15.2; 244/53 B; 60/39.092
See application file for complete search history.

(56) References Cited

U.S. PATENT DOCUMENTS

| | | | | |
|---|---|---|---|---|
| 2,555,592 | A | | 6/1951 | Kelly |
| 2,944,631 | A | | 7/1960 | Kerry et al. |
| 3,421,296 | A | | 1/1969 | Beurer, Sr. |
| 3,449,891 | A | | 6/1969 | Shohet et al. |
| 3,483,676 | A | | 12/1969 | Sargisson |
| 3,575,259 | A | * | 4/1971 | Wilkinson .................. 181/214 |
| 3,664,612 | A | * | 5/1972 | Skidmore et al. ......... 244/53 B |
| 3,736,750 | A | * | 6/1973 | Britt .......................... 60/226.2 |
| 3,811,254 | A | | 5/1974 | Amello |
| 3,991,782 | A | * | 11/1976 | Schwarzler ................ 137/15.1 |
| 4,158,449 | A | | 6/1979 | Sun et al. |
| 4,165,849 | A | * | 8/1979 | Fox ............................. 244/113 |
| 4,203,566 | A | * | 5/1980 | Lord ............................ 244/57 |
| 4,291,530 | A | | 9/1981 | Ballard |
| 4,307,743 | A | * | 12/1981 | Dunn ........................ 137/15.1 |
| 4,474,344 | A | * | 10/1984 | Bennett .................... 244/53 B |
| 4,502,875 | A | * | 3/1985 | Ballard ........................ 55/306 |

| | | | |
|---|---|---|---|
| 5,106,397 | A | 4/1992 | Jaroszczyk et al. |
| 5,139,545 | A | 8/1992 | Mann |
| 5,662,292 | A | 9/1997 | Greene et al. |

(Continued)

FOREIGN PATENT DOCUMENTS

DE 11 81 063 B 11/1964

(Continued)

OTHER PUBLICATIONS

International Search Report, PCT/US2006/028831, dated Dec. 19, 2006, 5 pages.

*Primary Examiner*—William H Rodríguez
(74) *Attorney, Agent, or Firm*—Armstrong Teasdale LLP

(57) ABSTRACT

An air induction system for an engine having an improved mechanism for control of an intake door. The system includes a housing having an opening for receiving intake air. A power activated door is pivotable between a closed position wherein the opening is closed and an open position wherein intake air may enter through the opening. Linkages operatively connect an actuator cylinder to the door. The linkages are configured such that movement of the cylinder produces a corresponding rotation of the door which is non-uniform across the cylinder's range of motion. The linkages include first and second bellcranks mounted for pivotal motion, and a link which interconnects the bellcranks. Movement of the cylinder at a first position causes pivoting of the door, while movement at a second position causes substantially no pivoting of the door.

20 Claims, 13 Drawing Sheets

U.S. PATENT DOCUMENTS

| | | | |
|---|---|---|---|
| 5,697,394 A * | 12/1997 | Smith et al. | 137/15.1 |
| 6,349,899 B1 * | 2/2002 | Ralston | 244/53 B |
| 6,595,742 B2 | 7/2003 | Scimone | |
| 6,824,582 B2 | 11/2004 | Wilson | |
| 7,344,107 B2 * | 3/2008 | Campbell et al. | 244/58 |
| 2002/0182062 A1 | 12/2002 | Scimone | |
| 2007/0022723 A1 * | 2/2007 | Stelzer | 55/502 |

FOREIGN PATENT DOCUMENTS

| | | |
|---|---|---|
| DE | 36 26 973 A1 | 2/1988 |
| GB | 1 605 428 A | 3/2003 |

* cited by examiner

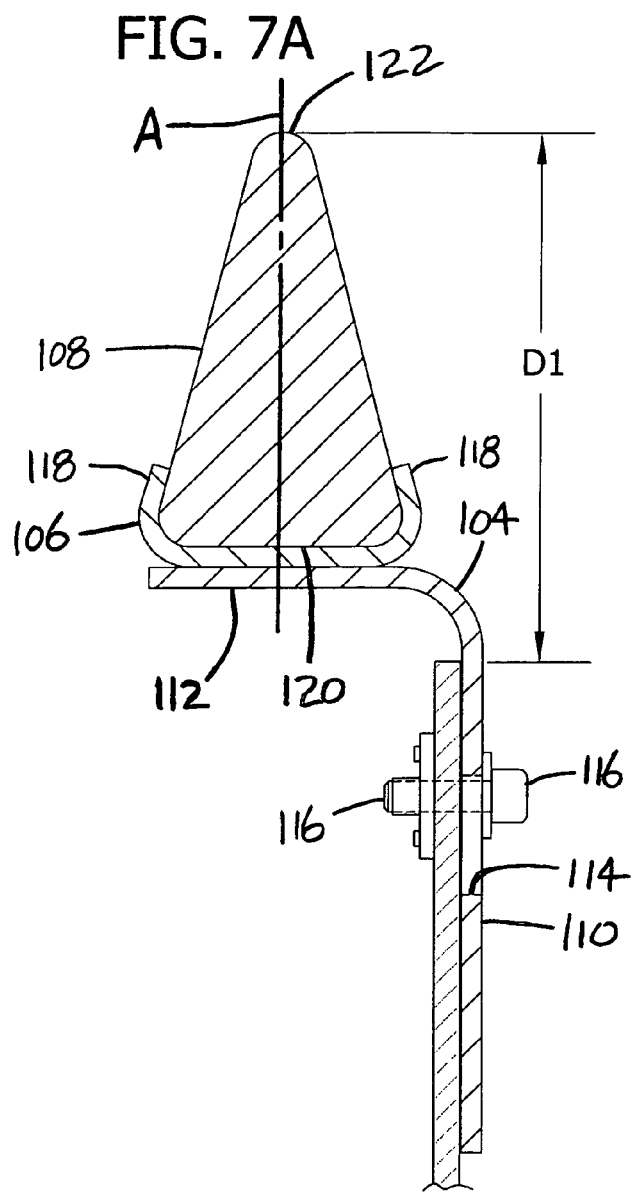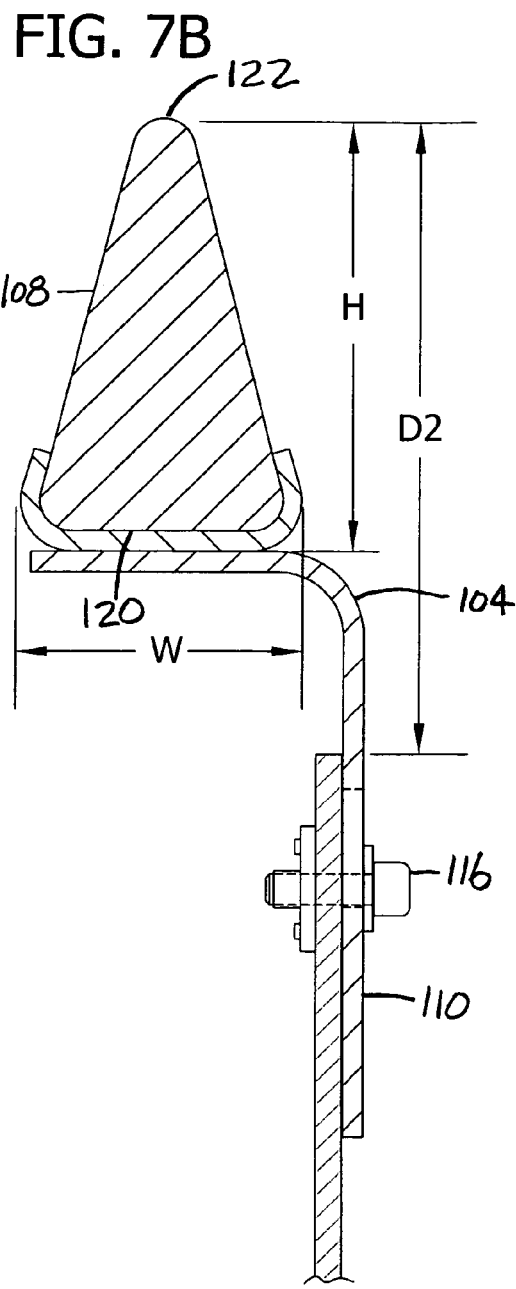

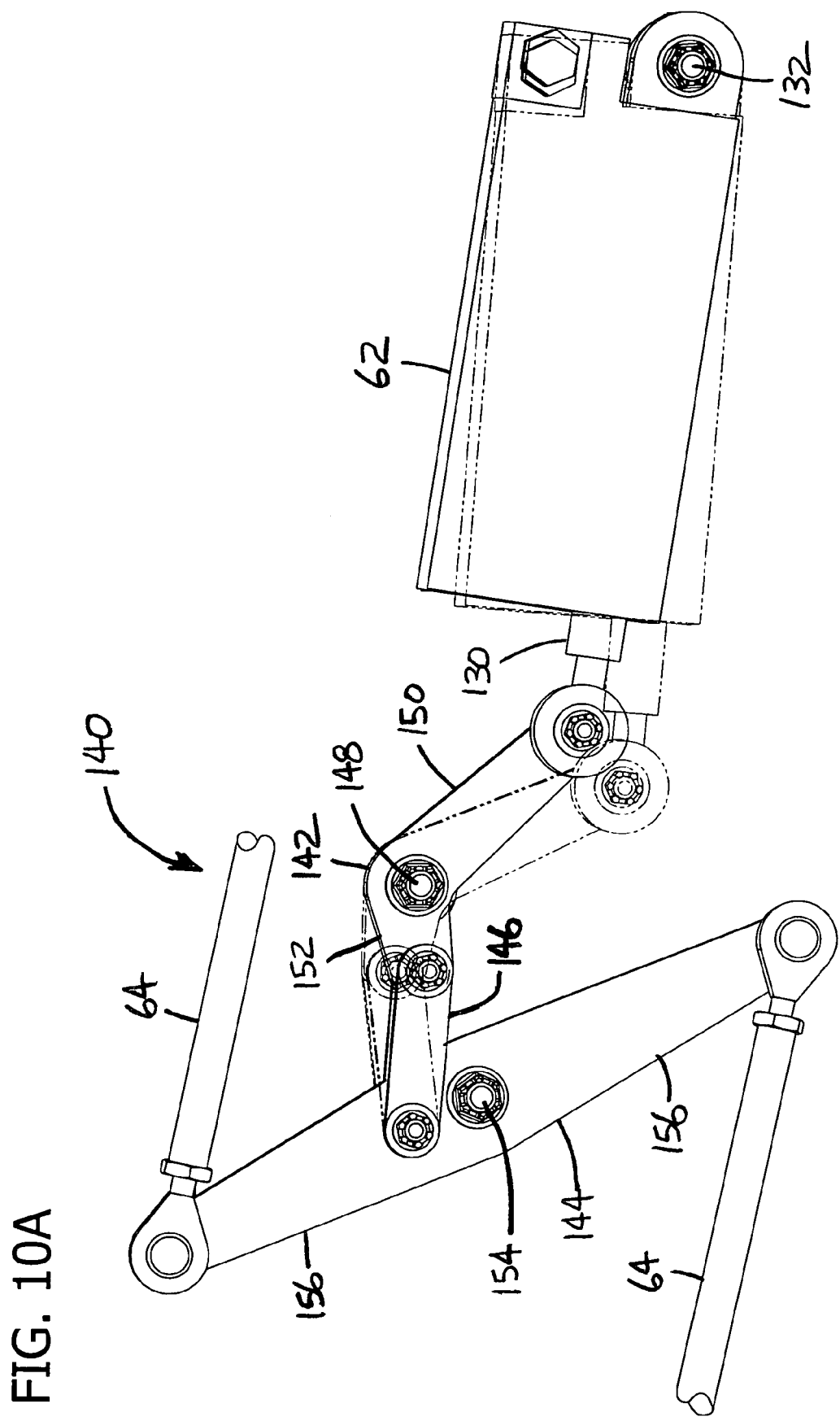

CONTROL OF ENGINE INTAKE DOOR

BACKGROUND OF THE INVENTION

This invention relates generally to air intakes for engines, and in particular to an air induction system having an improved mechanism for control of one or more intake doors.

An engine for aircraft propulsion requires intake air that is free from contaminants to provide for efficient combustion and avoid internal damage. The compressor and turbine are designed with small clearances between moving parts which maximize efficiency, but which also increase vulnerability to damage from small foreign particles. Contamination of intake air, even in a small amount, causes premature wear on engine components, increases maintenance costs, and degrades operational performance and reliability. Unfortunately, aircraft are exposed to contaminants when operating at low altitudes where air is frequently contaminated with material from the ground, such as sand and dust. That problem is aggravated for helicopters due to rotor downwash and prolonged low-altitude operation. Systems which remove foreign particles from intake flow have been developed to protect the engine from damage. A contaminant separator, such as a filter, is positioned across the intake of the engine.

Some intake systems have a bypass door which provides an alternate entryway for air. The bypass door is normally sealed to the alternate entryway through the use of a thin, flexible gasket thereby preventing contaminants from leaking into the filtered air stream. During normal operations, the door remains closed. But if the engine requires a quantity of air greater than it receives through the primary intake, such as when the contaminant separator becomes partially or fully clogged, the door is opened to permit continued intake of air and safe operation of the engine. Movement of the door between a closed position and an open position can be controlled through a motorized actuator with internal limit switches that detect the end of travel and turn off the motor, thereby stopping the motion of the actuator ram. Typically, the actuator is directly connected to the door. Activation of the motor moves the door to a desired position, whereupon the motor should automatically shut off.

In order to properly compress the door gasket, the actuator must be stopped at a precise position, often within 0.01 inches. In actual use, the internal limit switch often fails to stop the actuator motor at this precise position. Variations due to ambient temperature change, part tolerances, rigging tolerances, and supply voltage differences can create fluctuations in the position of the actuator at which the motor stops. Consequently, the motor is susceptible to continue running even after the bypass door has closed, causing burnout of the actuator motor and/or excessive force on the door and structure. Alternatively, the limit switch is subject to cut power to the motor before the door is fully closed allowing contaminants to enter the filtered air stream.

SUMMARY OF THE INVENTION

In general, an air induction system of the present invention is for an engine having a power activated door for controlling flow of intake air. The system comprises a housing having a hollow interior and an opening in the housing comprising an entryway for receiving intake air into the housing. The door is pivotable between a closed position wherein the opening is closed and an open position wherein intake air may enter the housing through the opening. An actuator cylinder is for pivoting the door. The cylinder is linearly movable in a stroke having a range of motion extending between a first end position corresponding with the door being open and a second end position corresponding with the door being closed. Linkages operatively connect the actuator cylinder to the door for transferring linear motion of the cylinder into rotational motion of the door. The linkages are configured such that movement of the cylinder through a distance produces a corresponding angular rotation of the door which is non-uniform across the cylinder's range of motion.

In another aspect, an air induction system of this invention is for an engine having a power activated door for controlling flow of intake air. The system comprises a housing having a hollow interior and an opening in the housing comprising an entryway for receiving intake air into the housing. The door is pivotable between a closed position wherein the opening is closed and an open position wherein intake air may enter the housing through the opening. An actuator is for pivoting the door, the actuator having a range of motion. Linkages operatively connect the actuator to the door. The linkages are arranged such that movement of the actuator at a first position within the range of motion causes pivoting of the door, and movement of the actuator at a second position within the range of motion causes substantially no pivoting of the door.

Other objects and features will be in part apparent and in part pointed out hereinafter.

BRIEF DESCRIPTION OF THE DRAWINGS

FIG. 7A is a section taken along line 7A-7A of FIG. 5C;

FIG. 7B is a section similar to FIG. 7A but with the seal moved to a different position;

FIG. 10A is an enlarged fragment of FIG. 8 showing an actuator and linkages of the system at a door-closed position.

Corresponding reference characters indicate corresponding parts throughout the several views of the drawings.

DETAILED DESCRIPTION OF THE PREFFERED EMBODIMENT

Figure 1:
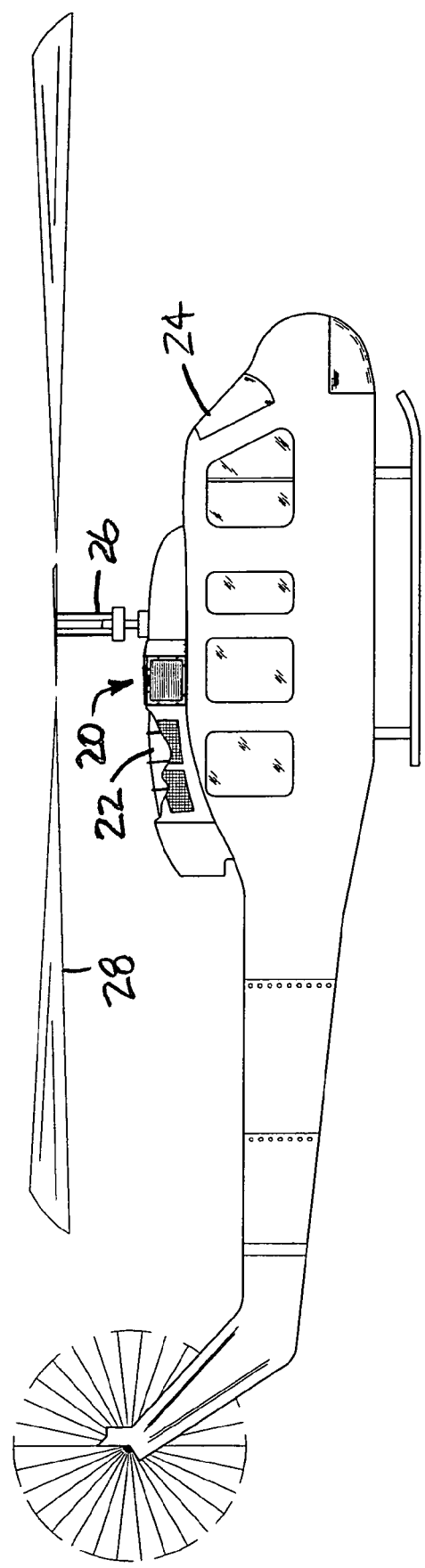
FIG. 1 is a side elevation, partially broken away, of a helicopter which incorporates an air induction system according to the present invention.
Figure 2:
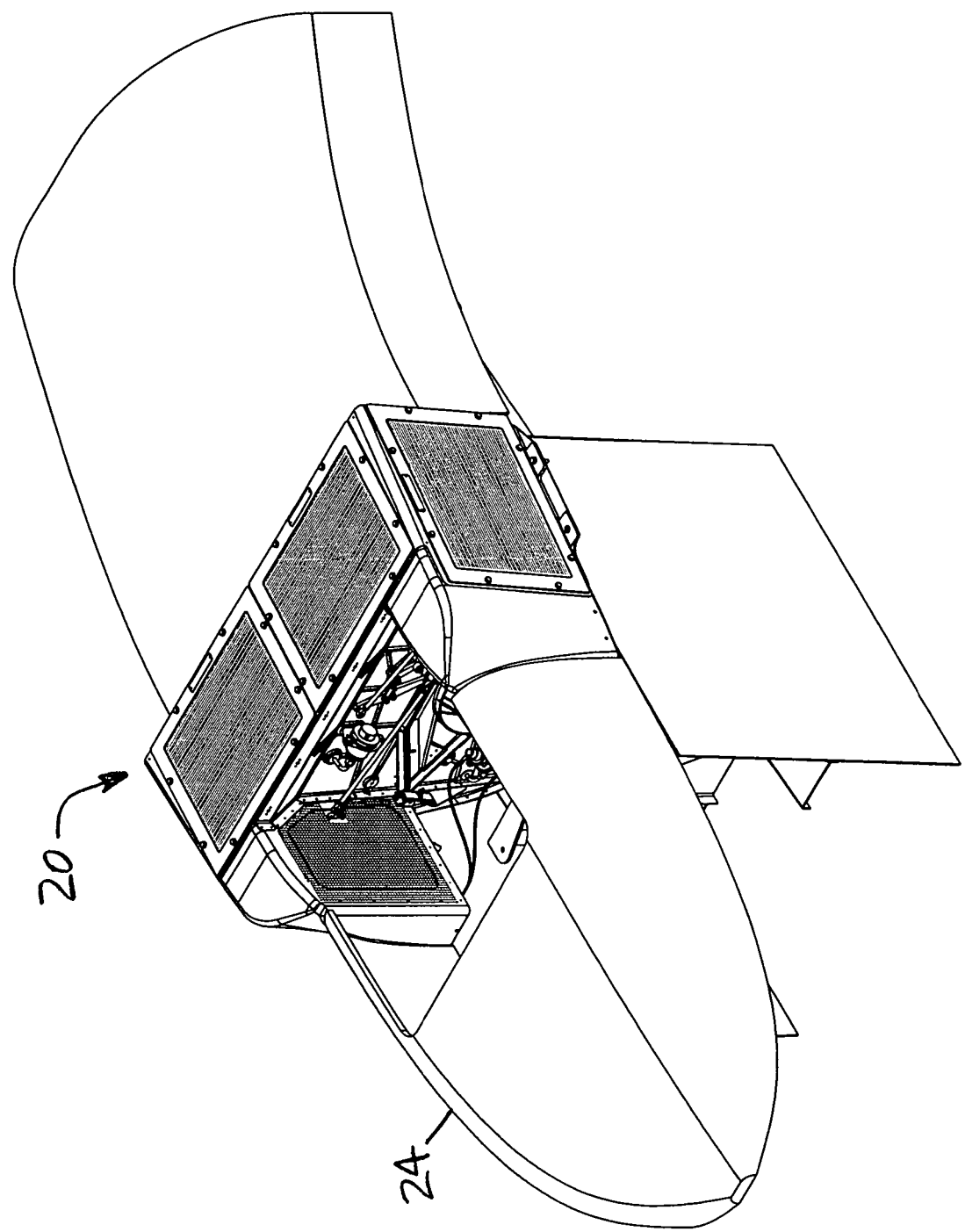
FIG. 2 is a perspective of the air induction system and portion of the helicopter of FIG. 1.
Figure 3:
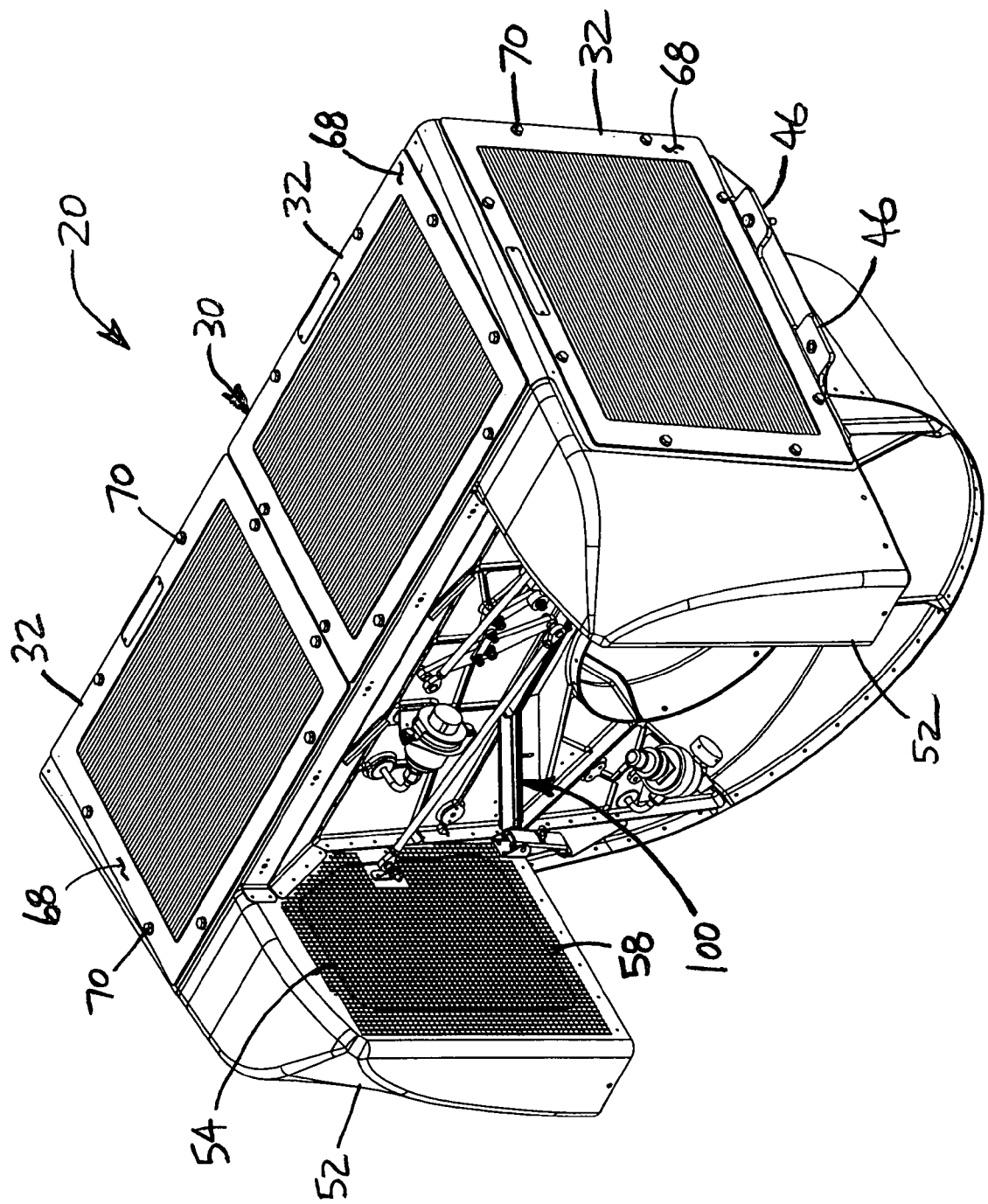
FIG. 3 is a front perspective of the air induction system.

Referring now to the drawings and in particular to FIGS. 1-3, an air induction system of the present invention is designated generally by 20. The system 20 is configured to receive intake air, remove contaminants from the intake air, and channel intake air to an engine 22 for ingestion by the engine. The system is primarily intended for use with a gas turbine engine which is installed in an aircraft such as a helicopter 24, more particularly as shown a Bell 205 helicopter. However, it is understood that the system can be used with other types of engines or equipment for various applications without departing from the scope of this invention. In the embodiment shown in FIGS. 1 and 2, the system 20 is positioned along the upper fuselage of the helicopter 24, immediately aft of a mast 26 of a rotor 28.

Figure 4:
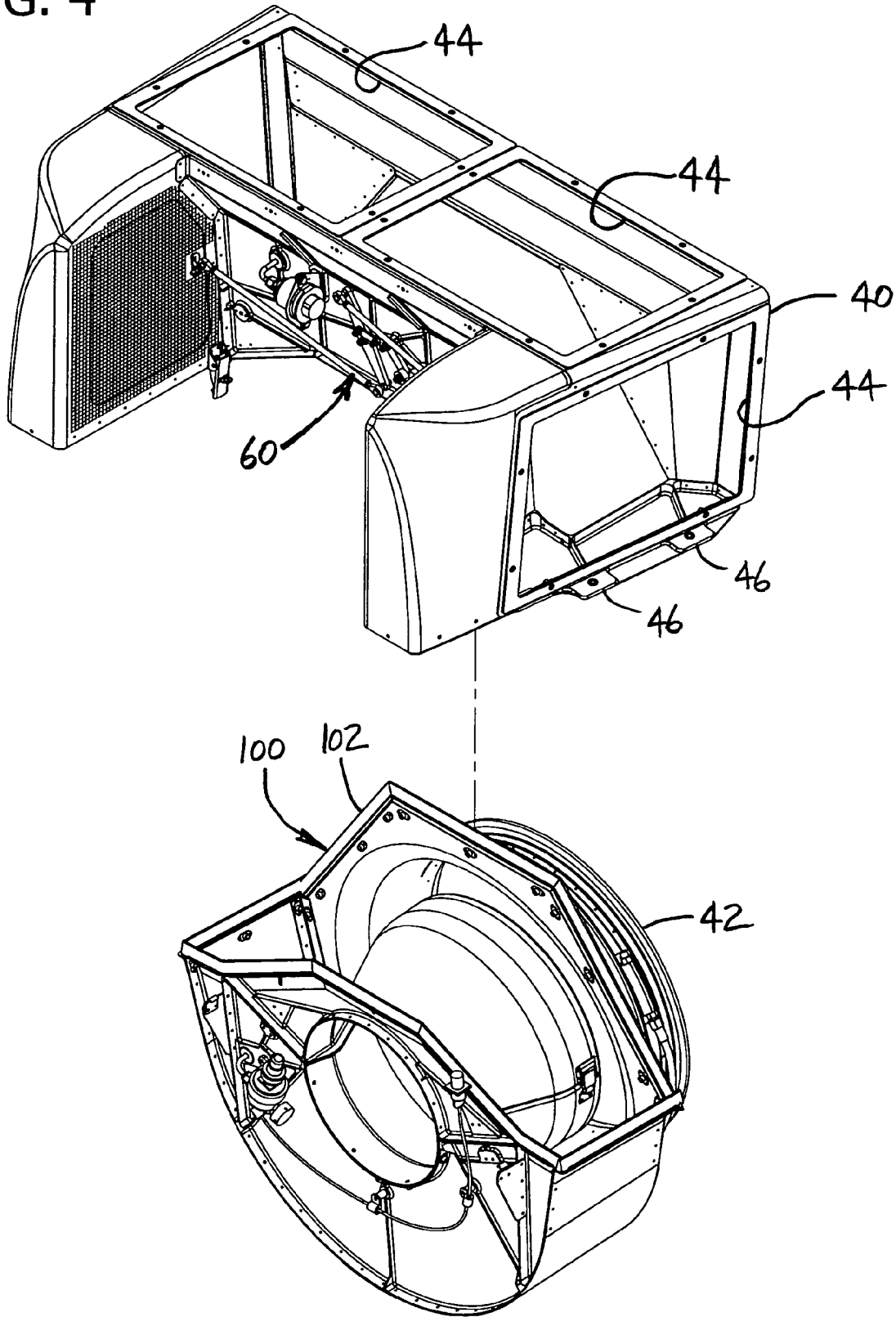
FIG. 4 is an exploded perspective of the system of FIG. 3 showing separable first and second housing sections, and with filter panels removed.

The air induction system 20 includes a housing, generally designated 30 (FIG. 3), which mounts barrier filter panels 32 each having a porous filter media. The housing has an external shape and size on its lower portion which is suitable for being received within a cavity (not shown) in the upper side of the helicopter 24 containing a segment of a transmission drive shaft 36. An upper portion of the housing has a shape and size providing a generally smooth and aerodynamic external contour along the helicopter. The shape and size may be selected to fit the particular installation for a favorable mechanical and aerodynamic integration, and may have alternate shapes or configurations. The housing 30 has a hollow interior defining an internal plenum which channels intake air toward the engine 22. The interior surfaces of the housing are generally smooth to provide for good airflow and pressure. As shown in FIG. 4, the housing 30 has two separable sections. In the embodiment shown, a first section 40 of the housing is an upper section and a second section 42 is a lower section. Configurations having a different number or orientation of separable sections do not depart from the scope of this invention. The housing is made of suitable rigid material(s), such as sheet metal or machined aluminum.

The first (upper) section 40 of the housing comprises a frame forming a generally rectangular enclosure. Four openings 44 (FIG. 4) in the housing comprise primary entryways for receiving air and are located on top and lateral surfaces. A flat filter panel 32 is mounted across each opening for protecting the engine from ingestion of contaminant particles. In the embodiment shown, there are opposite (left and right) substantially vertical filter panels 32 and two substantially horizontal filter panels 32 on top. The various orientations of the installed filter panels facilitate receiving intake air from different entry angles, thereby improving ram air pressure recovery and performance. The top panels receive downwash air from the rotor, particularly when the helicopter is hovering. The side filter panels are oriented with a small forward facing angle (e.g., between 3 and 20 degrees from the lateral direction) for good ram air pressure recovery when the helicopter 24 is in forward motion.

In one embodiment, each of the four filter panels 32 is located where it is readily accessible for periodic maintenance or replacement. Accordingly, maintenance actions take less time. Each of the four barrier filter panels 32 has the same shape and size such that all four are interchangeably usable in any of the openings 44, thereby eliminating the need for maintaining inventory of specific parts. It is understood that the number, orientations, and shape(s) of the openings and corresponding filter panels may vary without departing from the scope of this invention.

The first section 40 of the housing is attached to the airframe structure and supported therefrom. Tabs 46 on the lateral sides, shown in FIG. 3, receive fasteners for mounting to an adjacent structural surface of the helicopter.

The first section 40 of the housing also has a front wall 48 (FIGS. 8 and 9), a back wall 50, and two hollow extensions 52 projecting forward from the front wall. Each extension 52 has an opening 54 on its laterally inward face which comprises a bypass opening for receiving intake air into the housing that supplements or replaces primary intake air received through the barrier filter panels 32. A hinged door 56 covers each bypass opening 54 and is controllably rotatable between a closed position wherein the opening is closed and an open position wherein intake air may enter the housing through the opening. A coarse screen 58 (FIG. 3) also covers each opening 54 for preventing large contaminants such as leaves from entering the housing 30.

A mechanism indicated generally at 60 (FIGS. 4 and 8) is mounted on the front wall 48 for opening and closing the two bypass doors 56. During normal operation of the system, the doors 56 remain closed and all intake air enters the housing 30 through the filter panels 32. If the filters become clogged during flight, the doors 56 are partially or fully opened such that intake of air continues through the bypass openings 54, permitting continued safe operation of the engine 22. Movement of the doors 56 to an open position can be controlled through a motorized actuator 62 connected to the doors by push rods 64, which is described more fully below. Other configurations, including a system with a different number of bypass openings (or none), or doors which are not actively controlled, do not depart from the scope of this invention. Further, a mechanism such as herein described could be applied to a door for other openings or for use with other applications.

A conventional maintenance indicator 66 mounted on the front wall 48 is provided for indicating to maintenance personnel the need for cleaning or replacing the filter panels 32. The maintenance indicator 66 senses the pressure differential between the inside and outside of the housing.

Each filter panel 32 is generally flat and includes a pleated barrier filter element mounted in a retention frame 68 which securely retains the filter element in place, yet allows for its easy replacement. The retention frame 68 engages edges of a corresponding opening 44 in the housing 30, forming a seal such that all air must pass through the filter element to reach the interior of the housing. A rim of each filter panel has holes for receiving fasteners 70 to connect to the housing. Each filter is constructed such that if it should become plugged with contaminants to a degree where adequate airflow can not be provided to the engine, maintenance personnel can readily remove and clean the barrier filter media. Pleating of the barrier filter element effectively increases the surface area and rigidity of the filter element. The filter element is effective at separating contaminants from the air and provides a low pressure drop characteristic across the filter. The filter element is constructed of filter media made of a lightweight material that is resistant to damage by water and other liquids it may encounter. Preferred filter media includes woven cotton or polyester or a felt. A comb 72 (FIG. 9) extends across a center of the backside of each filter panel 32 to support and maintain separation of the pleats. Additional details on the filter panels are included in U.S. Pat. No. 6,595,742, entitled "Aircraft Engine Air Filter and Method," and U.S. Pat. No. 6,824,582, entitled "Filter System for Turbine Engine," each of which is hereby incorporated by reference.

It is understood that contaminant separators of various other configurations, such as non-pleated filters, filters formed with a different construction, and non-filtering inertial particle separators, do not depart from the scope of this invention.

Figure 5A:
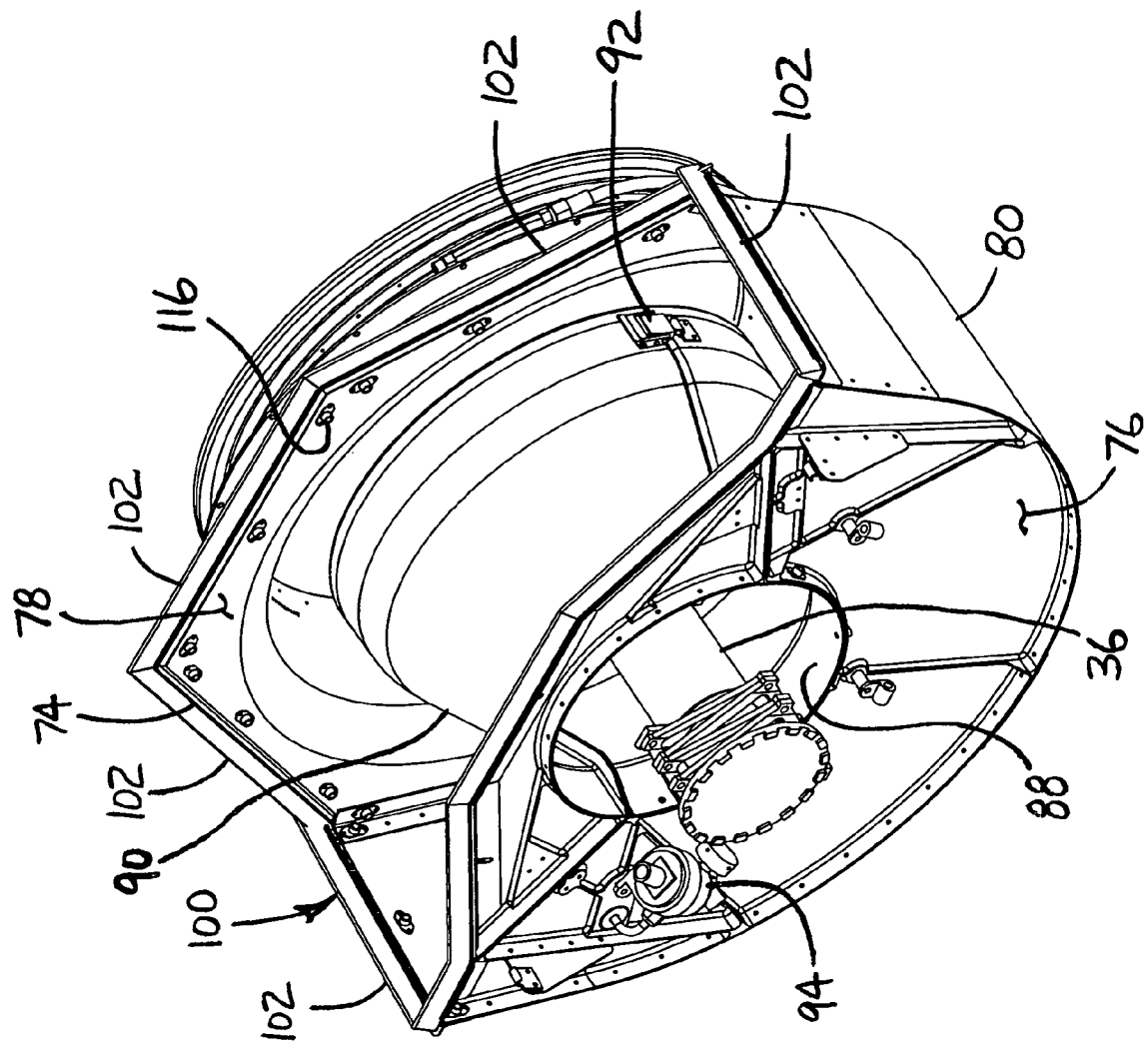
FIGS. 5A-5C are perspectives of the second (lower) housing section of the air induction system.
Figure 5B:
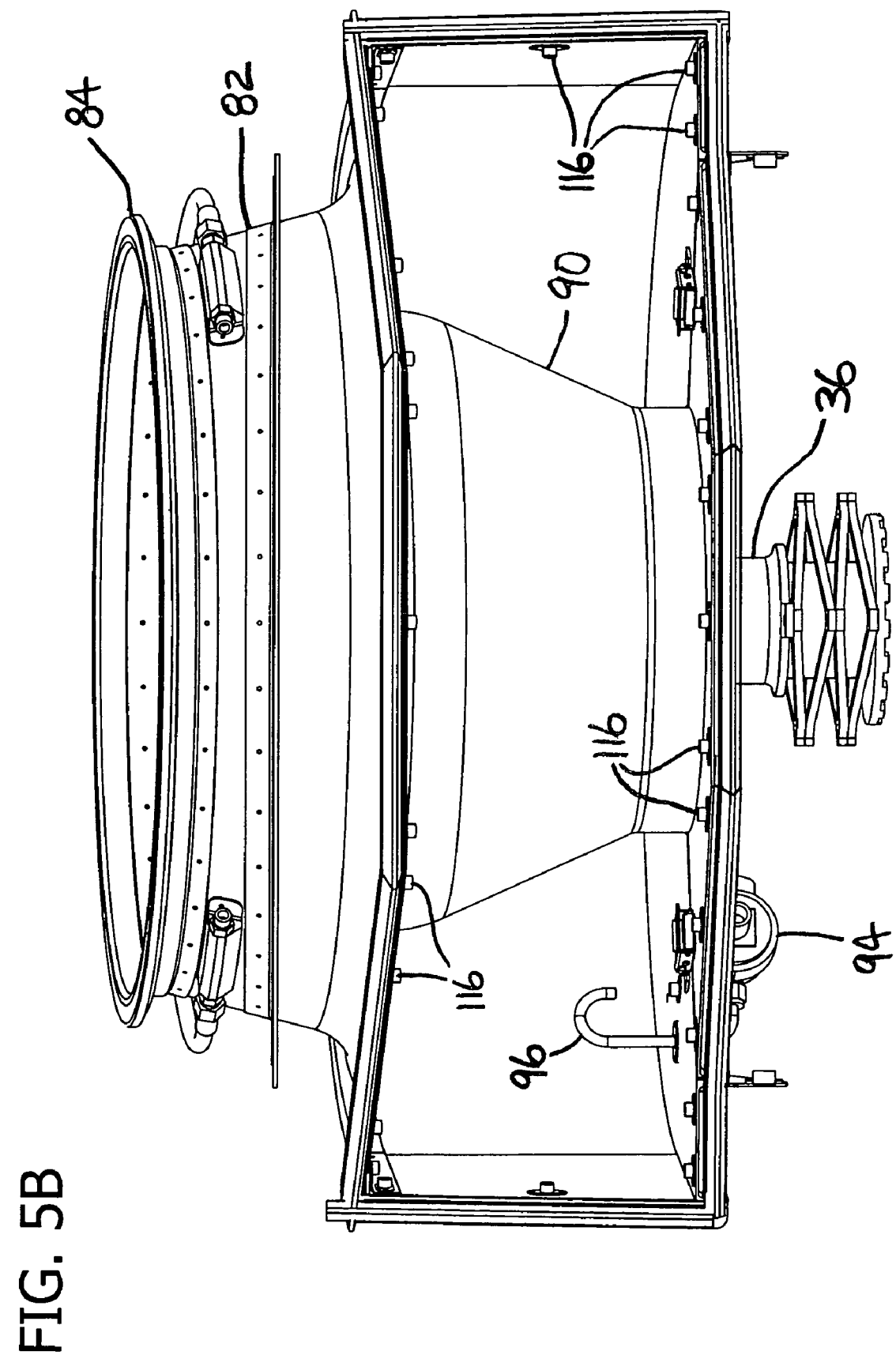
Figure 5C:
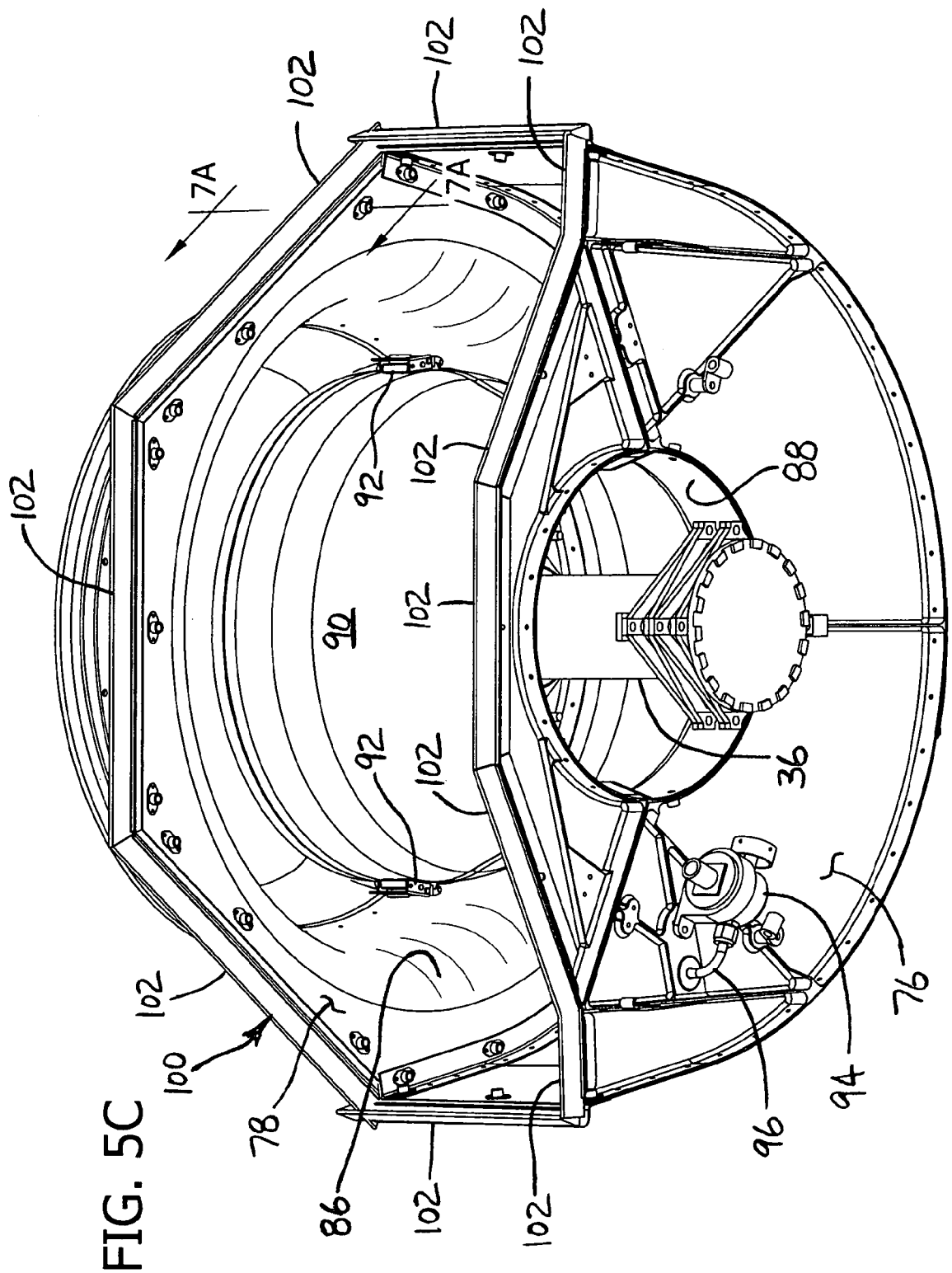

The second (lower) section 42 of the housing, shown in FIGS. 5A-5C, is supported by the engine 22 and has an external shape generally of a portion of a cylinder with a top edge 74 defining an open mouth for engagement by the first section 40. The second section has a substantial flat front wall 76, a back wall 78 spaced rearward from the front wall, and a U-shaped sidewall 80 between the front wall and the rear wall and extending in a semi-circular path. A rearward extending neck 82 (FIG. 5B) comprises an exit from the housing 30 and has an external flange 84 configured for clamping to the front of the engine 22. Although the system may be configured for various engines, the embodiment shown in the drawings is for an engine with an annular shaped inlet. The back wall 78 smoothly contours to a curved ring 86 (FIG. 5C) for delivering smooth airflow toward the engine. The second housing section 42 encloses a segment of the transmission drive shaft 36 which transmits torque from the engine 22 to the mast 26 of the rotor 28. A circular opening 88 in the front wall 76 receives the drive shaft 36 therethrough and is co-axially aligned with the shaft. A protective cover 90 with a generally conical shape extends from the edge of the opening 88 to a front of the engine 22. The cover 90 is made of a rigid material and has two separable halves connected by latches 92 used for disassembly during maintenance actions. Significantly, the cover 90 (as well as the entire housing interior) has generally smooth contours which avoid turbulence and discontinuities in the flow of intake air, thereby improving performance.

A conventional differential pressure sensor 94 is provided for alerting the pilot in the event that the barrier filters become significantly obstructed. The sensor 94, which is suitably mounted to the front wall 76 of the second housing section 42, causes a warning light to illuminate in the cockpit. The light alerts the pilot so that, if desired, the pilot may open the bypass door 56 to ensure that the engine 22 continues to operate with an adequate quantity of air. The pressure sensor 94 is connected to tubes 96 sensing the pressure both inside and outside of the housing.

The first and second sections of the housing 40, 42 are interengageable at a seam, indicated generally at 100 (FIG. 3), extending along the bottom edge of the first section and top edge of the second section. A seal 102 is located along the seam 100 to provide a generally airtight engagement between the first and second sections and prevent inadvertent passage of air into or out from the housing 30 at the seam. Although the seam 100 may have various alternate configurations, one embodiment includes ten straight seal segments 102 placed serially end-to-end around the entire seam. All ten segments 102 are adjustable, as described below, although one or more segments may be at a fixed (i.e., non-adjustable) position. The seal may have curved segments or only one continuous segment without departing from the scope of this invention.

Figure 6:
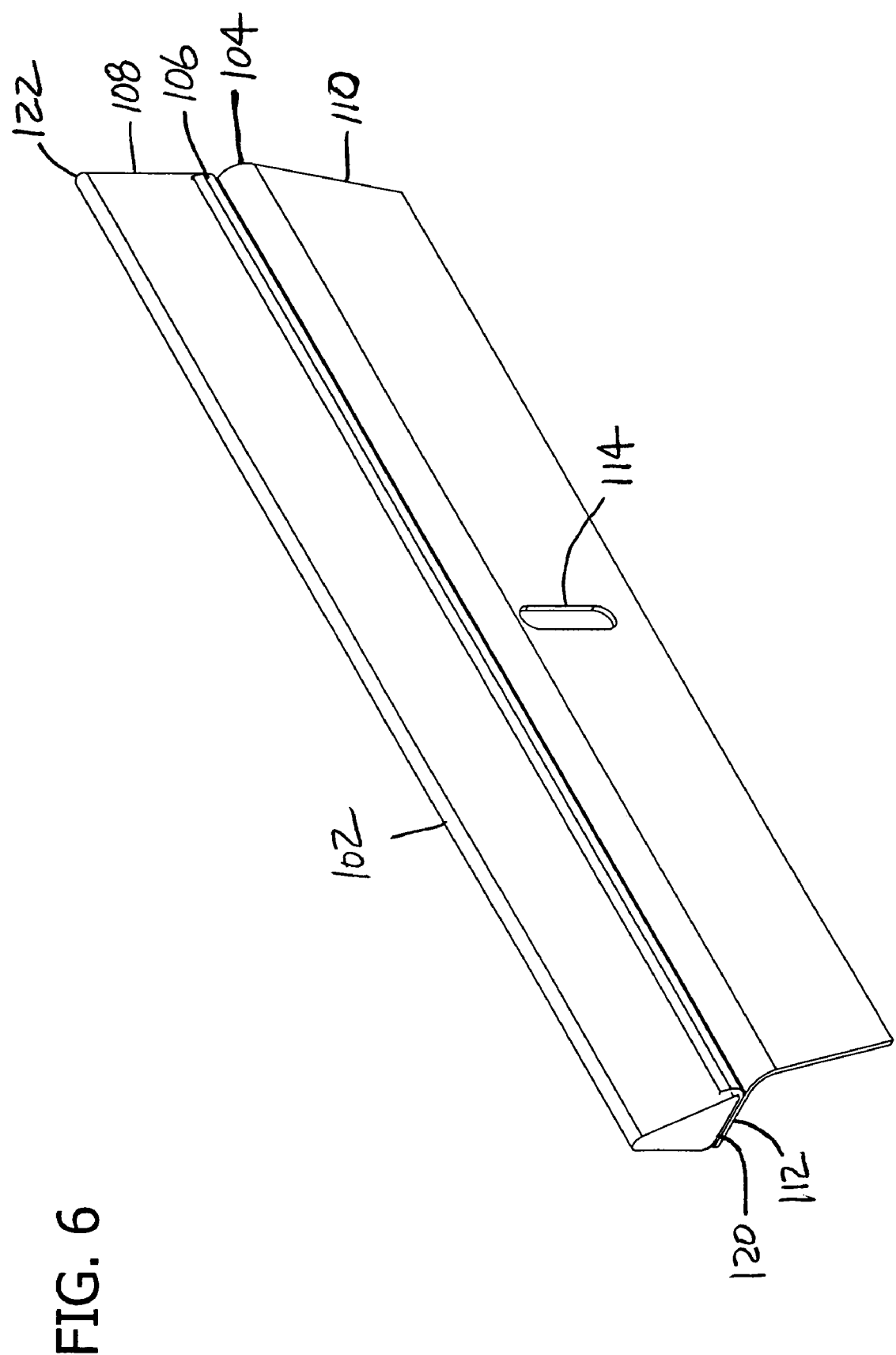
FIG. 6 is a perspective of a seal for placement between the first and second housing sections.

Referring to FIGS. 6, 7A, and 7B, each seal segment 102 of the illustrated embodiment is an assembly including a supporting base 104, a channel 106, and a flexible seal member 108. The base 104 comprises a rigid angle bracket having an attachment leg 110 and a mounting platform 112. An elongate slot 114 in the attachment leg 110 is sized and shaped for receiving a fastener 116 (FIGS. 5A, 5B, and 7A) to secure the base 104 to the second section 42 of the housing. The fastener 116 has an enlarged head which clamps the base 104 against the housing. Although the segment 102 shown in FIG. 6 has only one slot 114, a segment may have a plurality of spaced slots without departing from the scope of this invention. The channel 106 holds the seal member 108 and is fastened to the platform 112, such as by rivet fasteners (not shown). The channel 106 has upturned side flanges 118. An inner end 120 of the seal member 108 (FIG. 7A) is received in the channel 106 and is suitably retained on the channel by the upturned flanges 118 of the channel, and may also be adhered to the channel by an adhesive material. An outer end 122 (or tip end) engages the first section 40 of the housing when assembled.

Although the seal member 108 is shown in a generally vertical orientation, it may be placed at other angles (including horizontal) for other configurations. In this regard, the base 104 may be bent to change the angle between the leg 110 and the platform 112 for small adjustments.

The seal member 108 is shaped to enhance stability and durability. As shown in FIGS. 7A and 7B, the inner end 120 is wider than the outer end 122. Preferably, the seal member 108 is generally tall and narrow. While compression forces acting on the seal when the housing is assembled are directed generally vertically, there can be local horizontal components due to misalignments and to non-vertical motion during assembly. The shape of the seal member 108 facilitates the effective resistance of those forces and ensures that forces within the seal member tend to remain primarily vertical, which inhibits "flattening" of seals or formation of a permanently deformed shape. As shown in FIG. 7B, the seal member 108 with channel 106 has a height H greater than its width W. In one embodiment, and for example only, the height H is 0.80 inches and the width W is 0.50 inches, for a designed typical deflection when compressed by the first housing section of 0.30 inches.

The embodiment shown herein tapers smoothly from its inner end 120 to its outer end 122, and further has a cross-sectional shape which is generally triangular. When the first section 40 of the housing is installed in engagement with the outer end 122 of the seal, the shape facilitates efficient distribution of forces to the inner end 120 and base 104, thereby avoiding the tendency for the seal to roll over or permanently deform. Deflections of the seal member 108 are generally aligned with a central axis A, and any misalignments with forces applied to the seal member in other directions tend to be effectively resisted with an airtight seal and no significant deformations. It is understood that the seal 102 may have other shapes, including stepped or irregular contours, without departing from the scope of this invention.

The seal member 108 has a solid construction with no internal cavities. The solid construction inhibits collapsing when under compression forces, and also tends to inhibit the establishment of any permanent deformations. Accordingly, the seal 102 can be used repetitively (e.g., removing the first housing section for maintenance and then replacing it) without development of leaks. The seal member 108 is made of a suitable material which is flexible, resilient, and durable when exposed to high temperatures, as well as preferably being inexpensive. An exemplary material is a foam rubber.

The seal 102 has an adjustable connection to the second section 42 of the housing 30 to promote effective sealing. As shown in FIG. 7A, the seal assembly is securable at a first position on the second section 42 wherein the seal extends out a distance D1 from the edge 74 of the second section for engagement with the first section 40. The distance may be selectively changed by loosening the fastener 116 to unclamp the seal 102 from the first position, moving it to a second position (FIG. 7B) wherein the seal extends out a different distance D2, tightening fastener 116, and securing the seal at the second position. Movement is facilitated by the elongate slot 114 in the base 104 and the fastener 116 received in the slot. The seal 102 is adjustable by sliding the base and slot along the fastener while it is loosely installed in the housing. In FIG. 7A, the fastener 116 is near a top of the slot 114, whereas in FIG. 7B it is near a bottom of the slot. It is understood that the fastener may be located at intermediate positions along the slot, and the slot may be relatively longer or shorter. Further, the seal assembly may be adjustable on two or more axes.

Although the fasteners 116 extending through the slots 114 are adequate to secure the seal 102 to the second section 42 of the housing, additional non-adjustable fasteners (not shown) may be installed by drilling or piercing the attachment leg 110 of the base 104. These non-adjustable fasteners would thereby fix or lock the seal 102 in position.

During installation of the engine 22 into the helicopter 24, its position is "shimmed," or adjusted to align the engine drive shaft with the transmission drive shaft 36. Afterwards, the drive shafts are connected, the second housing section 42 is attached to the front of the engine, and the first housing section 40 is attached to the helicopter. Because the second section 42 is engine-mounted, adjustment of the engine has the potential to place the second section at a position where there are misalignments and non-uniform gaps at the seam 100. A person can visually inspect the seam 100 around its perimeter to verify the engagement of the seal member 108. If there are any gaps, the first housing section 40 may be removed, and the position of one or more seal segment 102 may be adjusted as described above. Because the seal is in segments, it is necessary to change only those segment(s) needing adjustment. After an airtight seal has been established, it is repeatably usable with that engine indefinitely because the engine will not move substantially nor require re-alignment after its initial installation.

While the first (upper) housing section 40 is mounted to and supported by the airframe structure, the second (lower) housing section 42 is supported by the engine. That permits the seal to be located between housing sections where it is not exposed to high-speed flow of intake air, improving effectiveness, durability, and capacity for high differential pressure. In contrast, a conventional system has an intake supported substantially entirely by the airframe structure. It has a corrugated rubber seal located at the front of the engine, covering the drive shaft and directly exposed to intake air as it accelerates into the engine. Thus, the present system avoids a seal with a corrugated surface and instead permits smooth and sturdy internal surfaces for good airflow and pressure recovery of intake air.

Figure 8:
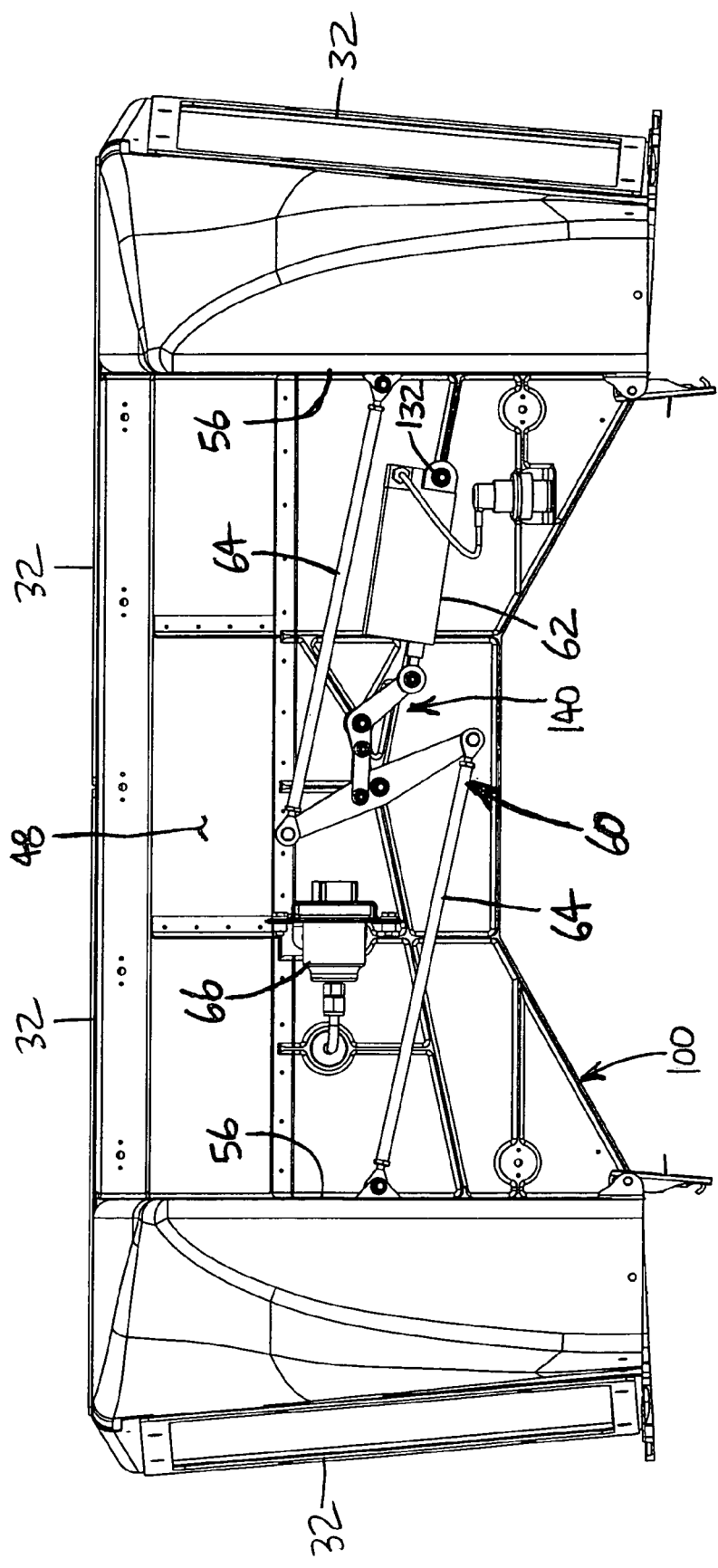
FIG. 8 is a front elevation of the first (upper) housing section of the air induction system.
Figure 9:
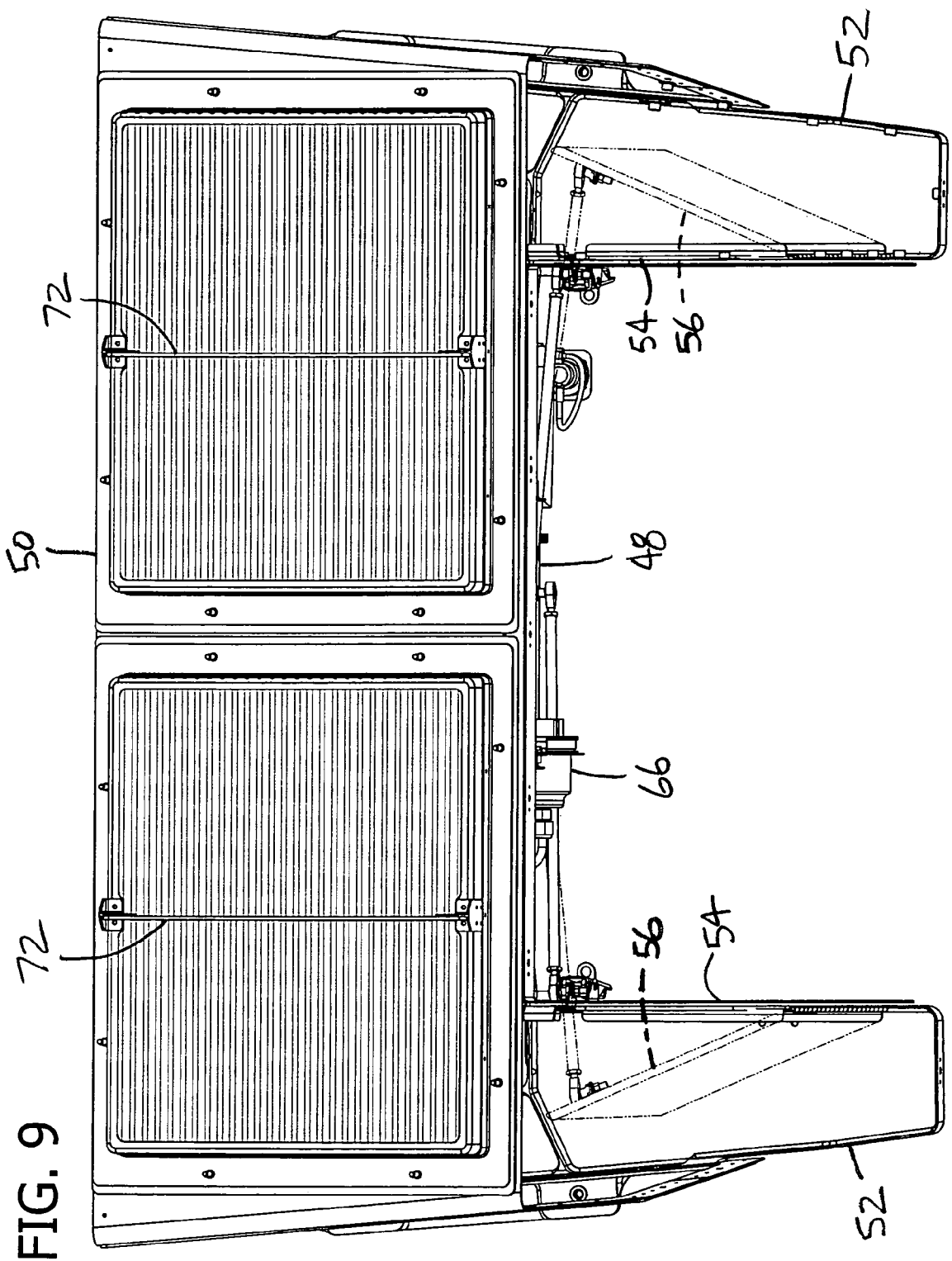
FIG. 9 is a bottom view of the first housing section, showing in phantom bypass doors in an open position.
Figure 10B:
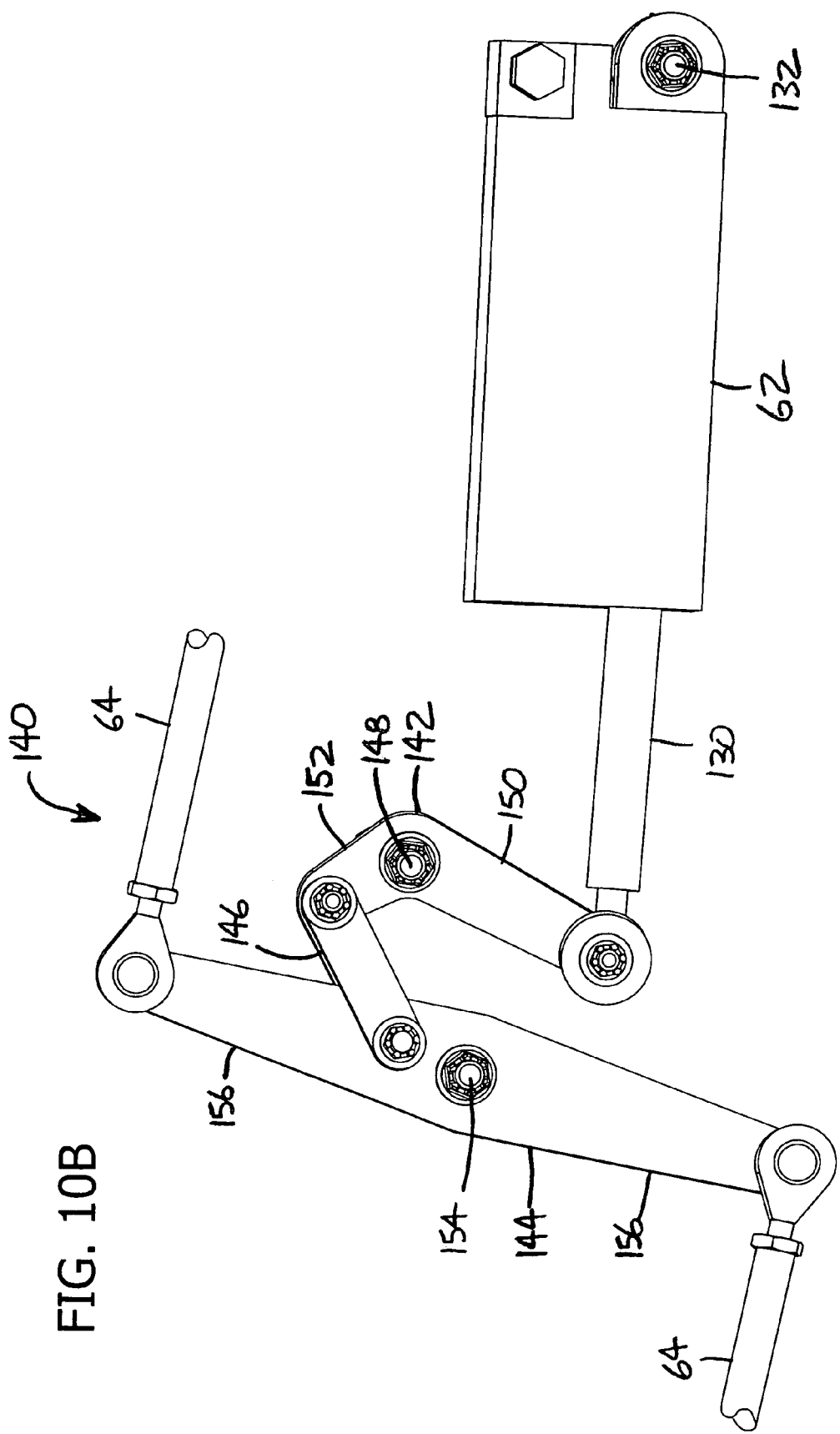
FIG. 10B is similar to FIG. 10A but showing the actuator and linkages of the system at a door-open position.

Referring to FIGS. 8, 10A, and 10B, the mechanism 60 for opening and closing the bypass doors 56 is mounted to the front wall 48 of the first housing section 40. It includes an electro-mechanical actuator 62 having a cylinder 130 movable in a linear stroke. The actuator 62 is pivotally mounted to the front wall 48 at a pivot point 132 located near one end of the actuator (the right hand end in FIGS. 8 and 10). A system of linkages, indicated generally at 140, operatively connect the actuator cylinder 130 to the bypass doors 56 for transferring linear motion of the cylinder into rotational motion of the doors. The linkages 140 include first and second rotatable bellcranks 142, 144, a link 146 which interconnects the bellcranks, and two rods 64 extending between the second bellcrank and respective bypass doors. Other linkage arrangements do not depart from the scope of this invention.

The first bellcrank 142 is pivotally mounted to the front wall 48 at a central pivot point 148 and has two arms, including a longer arm 150 and a shorter arm 152, extending at an oblique angle relative to each other. The actuator cylinder 130 is connected at its outer end to the longer arm 150, and the link 146 is connected to the shorter arm 152. The link 146 comprises a straight member pivotally attached at its respective ends to bellcranks, with no direct attachment to the front wall 48. The second bellcrank 144 is rotatably fastened to the front wall at a central pivot point 154 and has two arms 156 extending in opposite directions such that the second bellcrank is generally straight. Each push rod 64 extends from one of the ends of the second bellcrank 144 to a respective bypass door 56, and each is pivotally connected to the bellcrank and bypass door. Movement of the cylinder 130 rotates the first bellcrank 142, which then moves the link 146 and (depending on position) rotates the second bellcrank 144 to move the push rods 64 and pivot the bypass doors 56.

Simultaneous movement of both bypass doors 56 is effected by the single actuator 62. However, the system could be arranged with independent actuators for each door, or it could have a single bypass door. Further, the mechanism may be applied to doors other than for a bypass or entryway (e.g., a door covering a sensor).

Significantly, the linkages 140 are configured such that movement of the actuator cylinder 130 produces a corresponding angular rotation of the doors 56 which is non-uniform across the cylinder's range of motion. That is, the effect of movement of the actuator cylinder 130 through a given distance varies depending upon the position of the linkages 140. The stroke of the cylinder has a range of motion extending between a first end position (FIG. 10B) corresponding with the door 56 being open and a second end position (FIG. 10A) corresponding with the door being closed. The linkages 140 are arranged such that, at the first end position of FIG. 10B, movement of the cylinder 130 affects rotation of both bellcranks 142, 144, and moves the push rods and bypass doors. However, at the second end position of the cylinder, movement of the cylinder causes rotation of the first bellcrank 142 but does not transfer significant rotation of the second bellcrank 144 as shown on FIG. 10A. Consequently, there is no movement of the push rods 64 nor rotation of the bypass doors 56. In moving from the position marked by solid lines to the position marked in phantom, the cylinder 130 has moved a distance out from the actuator body 62 with no significant effect on the second bellcrank 144.

Because the link 146 is generally perpendicular to the second bellcrank 144, it pivots without causing rotation of the second bellcrank. There is a "dwell" range within which movement of the cylinder 130 produces no effect upon the doors 56. In the illustrated embodiment, that range is adjacent to the second end position, and includes about 0.25 inches of cylinder travel, corresponding to about 15 degrees of rotation of the first bellcrank 142. Linkages configured to affect other positions in the stroke do not depart from the scope of this invention. Further, the non-uniform effect could be a smaller or larger impact on rate of door rotation (i.e., not a null effect as discussed above).

It is understood that while the embodiment shown in the drawings includes a mechanism for simultaneously opening/closing two doors, other mechanisms having fewer or greater number of doors, or which open/close doors in a sequential order, do not depart from the scope of this invention.

As mentioned, the actuator 62 has a limit switch (not shown) which automatically stops the motor of the actuator at a selectable position of the cylinder 130 along its stroke. The operator adjusts the push rods 64 to allow the limit switch to stop the actuator when the linkages are within the "dwell" range, preferably near a center of the range. Thus, upon reaching the point where the doors 56 are fully closed, the retraction of the cylinder 130 continues until reaching the rigged cut-off position, where the switch is triggered and power to the motor will be automatically stopped. There is no need for a highly precise cut-off position. Variation, such as due to ambient temperature change, supply voltage, and tolerances, may affect the position of the cylinder 130 at which the motor stops. However, there is no impact upon the second bellcrank 144 nor upon the doors 56. Consequently, the system can be easily rigged such that the motor will not shut off before the bypass doors 56 are fully closed, nor continue running after the door has closed.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

What is claimed is:

1. An air induction system for an aircraft engine having a power activated door for controlling flow of intake air, the system comprising:
    a housing having a hollow interior and an opening in the housing comprising an entryway for receiving intake air into the housing;
    said door, the door being pivotable between a closed position wherein said opening is closed and an open position wherein intake air enters the housing through said opening;
    an actuator cylinder for pivoting the door, the cylinder being linearly movable in a stroke having a range of motion extending between a first end position corresponding with the door being open and a second end position corresponding with the door being closed; and
    linkages which operatively connect the actuator cylinder to the door for transferring linear motion of the cylinder into rotational motion of the door, the linkages being configured such that movement of the cylinder through a distance produces a corresponding angular rotation of the door,
    wherein the second end position is within a portion of the stroke defining a dwell range wherein movement of the cylinder produces substantially no rotation of the door.

2. An air induction system as set forth in claim 1 wherein said linkages comprise first and second bellcranks mounted for pivotal motion, a link which interconnects the bellcranks, and a rod extending between the second bellcrank and the door.

3. An air induction system as set forth in claim 2 wherein the linkages are arranged such that, at the second end position of the cylinder, movement of the cylinder causes rotation of the first bellcrank but no rotation of the second bellcrank.

4. An air induction system as set forth in claim 1 wherein the opening comprises a first opening, the door comprises a first door, and the rod comprises a first rod, and wherein the system further comprises a second opening in the housing, a second door, and a second rod, and wherein simultaneous movement of the first door and second door is effected by said actuator cylinder.

5. An air induction system as set forth in claim 1 wherein said opening in the housing comprises a bypass opening for receiving intake air into the housing that augments or replaces primary intake air.

6. An air induction system as set forth in claim 5 further comprising a primary opening formed in the housing comprising a primary entryway, and a barrier filter having a porous media mounted across the primary entryway.

7. An air induction system as set forth in claim 6 wherein the housing has four of said primary entryways and four corresponding barrier filters, and wherein each of the four barrier filters has the same shape and size such that the four filters are interchangeably usable.

8. An air induction system as set forth in claim 7 wherein said barrier filters include at least one substantially horizontal filter at a top of said housing and at least one substantially vertical filter at a lateral side of said housing, and wherein said substantially vertical filter at said lateral side is oriented to face partially in a forward direction.

9. An air induction system for an aircraft engine having a power activated door for controlling flow of intake air, the system comprising: a housing having a hollow interior and an opening in the housing comprising an entryway for receiving intake air into the housing; said door, the door being pivotable between a closed position wherein said opening is closed and an open position wherein intake air enters the housing through said opening; an actuator for pivoting the door, the actuator having a range of motion; and linkages which operatively connect the actuator to the door;
    the linkages comprising first and second bellcranks mounted for pivotal motion, a link which interconnects the bellcranks, and wherein movement of the actuator at said first position causes rotation of the first bellcrank and a corresponding rotation of the second bellcrank to thereby pivot the door, and movement of the actuator at said second position causes rotation of the first bellcrank but substantially no rotation of the second bellcrank and substantially no pivoting of the door.

10. An air induction system as set forth in claim 9 wherein the linkages further comprise a rod extending between the second bellcrank and the door.

11. An air induction system as set forth in claim 10 wherein the opening comprises a first opening, the door comprises a first door, and the rod comprises a first rod, and wherein the system further comprises a second opening in the housing, a second door, and a second rod, and wherein simultaneous movement of the first door and second door is effected by said actuator cylinder.

12. An air induction system as set forth in claim 9 wherein the second position is within a portion of said range of motion defining a dwell range wherein movement of the actuator produces substantially no rotation of the door.

13. An air induction system as set forth in claim 9 wherein the actuator is operated remotely.

14. An air induction system as set forth in claim 9 wherein said opening in the housing comprises a bypass opening for receiving intake air into the housing that augments or replaces primary intake air.

15. An air induction system as set forth in claim 14 further comprising a primary opening formed in the housing comprising a primary entryway, and a barrier filter having a porous media mounted across the primary entryway.

16. An air induction system as set forth in claim 15 wherein the housing has four of said primary entryways and four corresponding barrier filters, and wherein each of the four barrier filters has the same shape and size such that the four filters are interchangeably usable.

17. An air induction system as set forth in claim 16 wherein said barrier filters include at least one substantially horizontal filter at a top of said housing and at least one substantially vertical filter at a lateral side of said housing, and wherein said substantially vertical filter at said lateral side is oriented to face partially in a forward direction.

18. A helicopter comprising:
    an engine;
    an air induction system including:
    a housing having a hollow interior and an opening in the housing comprising an entryway for receiving intake air into the housing;
    a power activated door for controlling flow of intake air, the door being pivotable between a closed position wherein the opening is closed and an open position wherein intake air enters the housing through the opening;

an actuator cylinder for pivoting the door, the cylinder being linearly movable in a stroke having a range of motion extending between a first end position corresponding with the door being open and a second end position corresponding with the door being closed; and linkages that connect the actuator cylinder to the door, the linkages comprising first and second bellcranks mounted for pivotal motion, and a link which interconnects the bellcranks, the stroke of the cylinder including a dwell range wherein movement of the cylinder produces no rotation of the door, the dwell range being adjacent the second end position; and wherein movement of the actuator at said first position causes rotation of the first bellcrank and a corresponding rotation of the second bellcrank to thereby pivot the door, and movement of the actuator at said second position causes rotation of the first bellcrank but no rotation of the second bellcrank and no pivoting of the door.

19. The helicopter of claim 18 wherein the dwell range includes about 0.25 inches of cylinder travel and corresponds to about 15 degrees of rotation of the first bellcrank.

20. The helicopter of claim 18 wherein the first bellcrank has first and second arms that extend at an oblique angle relative to each other.

* * * * *

UNITED STATES PATENT AND TRADEMARK OFFICE
CERTIFICATE OF CORRECTION

PATENT NO.       : 7,575,014 B2  
APPLICATION NO.  : 11/192900  
DATED            : August 18, 2009  
INVENTOR(S)      : James F. Stelzer Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1025 days.

Signed and Sealed this

Seventh Day of September, 2010

David J. Kappos  
*Director of the United States Patent and Trademark Office*